United States Patent [19]
Knapp et al.

[11] 3,824,709
[45] July 23, 1974

[54] DYNAMIC CHILDBIRTH SIMULATOR FOR TEACHING MATERNITY PATIENT CARE

[75] Inventors: Charles F. Knapp; George S. Eades, both of Lexington, Ky.

[73] Assignee: The University of Kentucky Research Foundation, Lexington, Ky.

[22] Filed: Nov. 5, 1973

[21] Appl. No.: 412,756

Related U.S. Application Data
[62] Division of Ser. No. 308,542, Nov. 21, 1972.

[52] U.S. Cl. .................................................. 35/17
[51] Int. Cl. ........................................ G09b 23/32
[58] Field of Search ........................................ 35/17

[56] References Cited
UNITED STATES PATENTS
2,551,433   5/1951   Graves .................................... 35/17

*Primary Examiner*—Harland S. Skogquist
*Attorney, Agent, or Firm*—William E. Sherwood

[57] ABSTRACT

A programmable patient simulator for teaching maternity patient care includes a life size manikin with a pelvis, vaginal canal, uterus, placenta, umbilical cord, and a fetal doll from which heart sounds are emitted. A programmable electro-pneumatic system controls the simulated uterine contractions, position of the uterus, rupture of membranes, expulsion of fetal doll, and fetal heart rate during labor and delivery sequence. The invention described herein was made in the course of work under a grant or award from the Department of Health, Education and Welfare.

4 Claims, 13 Drawing Figures

DYNAMIC CHILDBIRTH SIMULATOR FOR TEACHING MATERNITY PATIENT CARE

This is a division of application Ser. No. 308,542 filed Nov. 21, 1972.

BACKGROUND OF THE INVENTION

The training of students in the art of maternity patient care has long been handicapped by the artificial nature of the construction and operation of the models which are employed by the instructor to illustrate the sequence of labor and delivery in childbirth. For example, models of the type shown in Jacobs U.S. Pat. No. 2,127,774 and Graves U.S. Pat. No. 2,551,433 lack realism in that the fetal doll must be manually moved by the instructor and no close similitude to the real life steps of childbirth can be taught to the student, due in large part to the non-dynamic nature of the equipment.

Moreover, optimum value of the instruction being offered requires that the student handle the model as by palpating the uterus, listening to the heart beat of the doll, and observing the degree and frequency of uterine contractions. Preferably, this also requires the use of a life size model of manikin having a natural appearance and providing to the student a life like tactile sensation when being handled. It is a purpose of the present invention to provide an improved childbirth simulator in which these and other disadvantages of conventional equipment will be overcome and by means of which a more realistic and accurate teaching of maternity patient care may be given to the student.

SUMMARY

The invention is embodied in a dynamic manikin simulating the torso of a pregnant human female and in which a fetal doll is located within a uterus housed in the manikin. Automatic means for controllably applying fluid pressure to the uterus serves to move the doll from the uterus and from the manikin, and the operation of this means is used to simulate labor during childbirth and to provide instruction for students in the art of maternity patient care.

Among the objects of the invention are the provision of an improved training device for teaching maternity patient care; the provision of an improved method of teaching maternity patient care; the provision of a fetal doll; the provision of an improved uterus device; the provision of an improved manikin; the provision of a placenta with attached umbilical cord and amniotic sac; the provision of means simulating the breaking of an amniotic sac; and the provision of an improved method of manufacturing the several elements of the training device.

These and other objects and advantages of the invention will become more apparent as the description proceeds and when considered in conjunction with the accompanying drawings in which.

Figure 1:
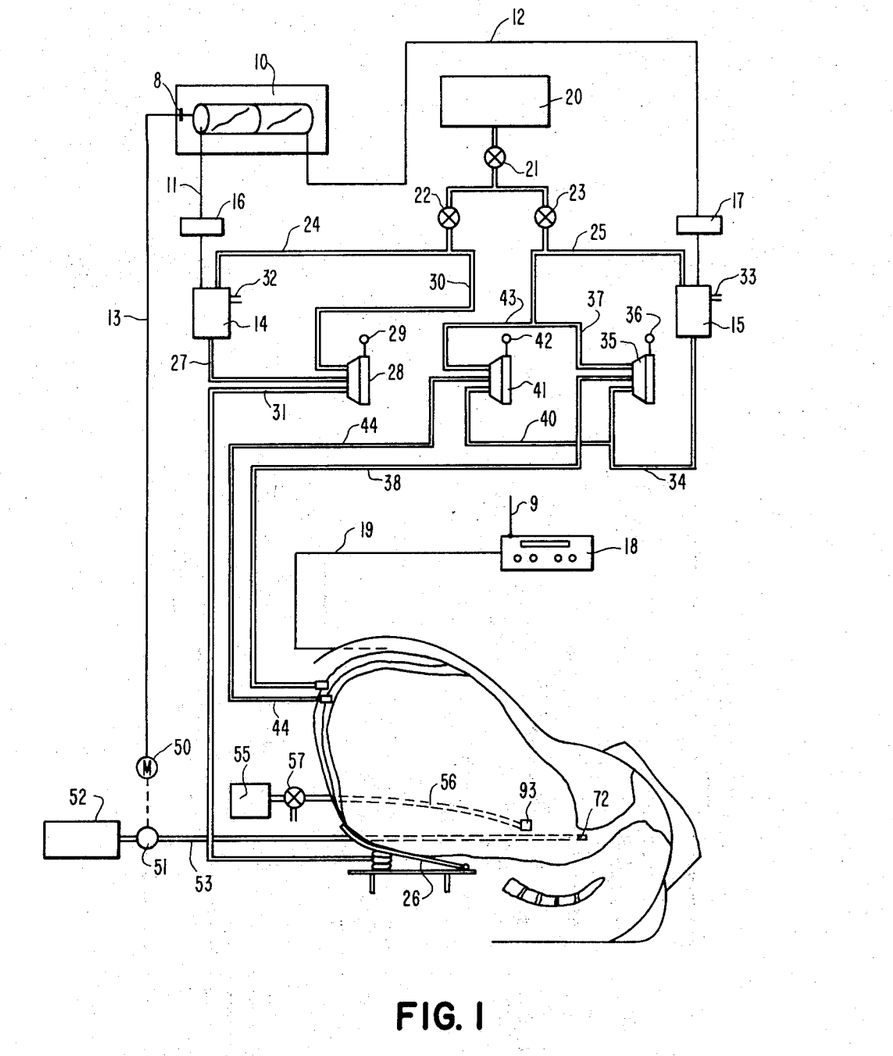
FIG. 1 is a diagrammatic view of a system for effecting responses in the dynamic manikin during the teaching procedure.
Figure 2:
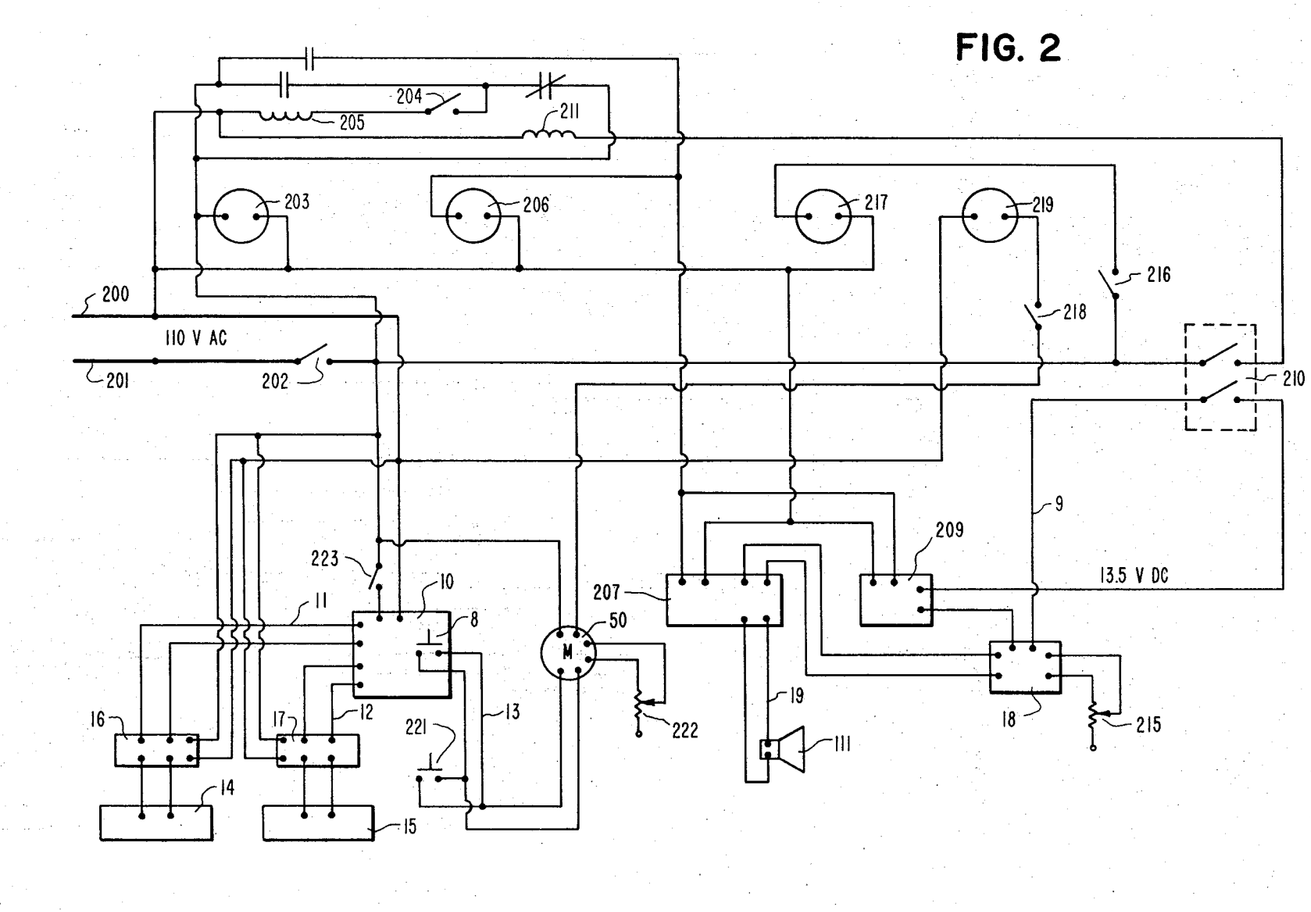
FIG. 2 is a portion of the electrical circuit under the control of the instructor at the control console.

Referring first to FIG. 1, the primary electrical and pressure fluid elements of the control system are indicated in relation to the childbirth simulator and are actuated in accordance with a prearranged pattern which represents physiological data offering the maximum of beneficial instruction to the student, it being understood that instructor-operated override controls may be employed to aid in the instruction procedures. A conventional two-channel data track follower 10 (such as the Data-Trak available from Research, Inc.) delivers a voltage proportioned to the curves scribed on its rotating drum through conductors 11, 12, and upon closing of a switch 8 will also establish a circuit through conductor 13. Conductors 11 and 12 lead respectively to electro-pneumatic transducers 14 and 15 (such as the type available from Conoflow Corp.) through conventional match packs 16, 17 serving to provide current supply consistent with the rating of the transducers. The conductor 9 extending from the control console circuit of FIG. 2 is connected to a heart sound simulator 18 from which a conductor 19 leads to a speaker 111 (FIG. 6) embedded in the fetal doll, as later to be described.

A compressed air reservoir 20 with a cut off valve 21 and with separate throttling valves 22, 23 supplies air through conduits 24, 25 to the valves associated with and controlled by the transducers. From transducer 14, which governs the operation of the uterus rocking member 26, later to be described, a conduit 27 leads to a conventional Fairchild-Hiller ratio relay 28 which may be adjusted as by means of a manually operable control 29. A conduit 30 in parallel with conduit 24 also leads to this relay and from this relay a conduit 31 leads to the rocking member; venting of thus described pressure system being through the vent 32 of the transducer housing.

Transducer 15 which governs the pressures applied to the uterus, includes a vent 33 in its housing as well as a conduit 34 leading to a second ratio relay 35 having a control means 36. A conduit 37 in parallel with conduit 25 leads to the relay 35 and from relay 35 a conduit 38 leads to the fundus chamber of the uterus. In addition, a branch conduit 40 controlled by transducer 15 leads to a third ratio relay 41 having a control means 42. A conduit 43 in parallel with conduit 37 also leads to this third relay and from the relay a conduit 44 leads to the inner chamber of the uterus.

Conductor 13 from the data track leads to a suitable motor 50 driving a pump 51 which draws water from a supply 52 and at an appropriate time discharges the same through conduit 53 and into a receptacle within the manikin simulating the amniotic sac. Moreover, for cervix thickening and thinning purposes, a suitable source 55 of compressed air leads through a conduit 56 to the cervix and is provided with a suitably actuated bleed valve 57 adapted to vent the conduit 56 in a controlled manner.

The Manikin

For realism in teaching, as well as for economic considerations since the equipment is intended for repeated usages, the materials used in constructing the fetal doll, placenta, uterus and manikin satisfy the requirements of being strong and durable, being compatabile with each other, and significantly having the feature of representing life like proportions, appearance, and tactile sensations. In constructing the manikin the following method is preferred.

A live model was placed on proper position on a delivery table and a molding material comprising Silastic A, available from Dow Corning Co., was mixed and poured over her body from the knee line to the breast line. After this material set up to provide an initial mold, a second layer comprising Silastic B material was poured on the initial mold to add strength and a plaster embossed cloth was applied over the layer of Silastic B to add rigidity to the thus formed initial mold. When the materials were sufficiently cured the initial mold having an open lower portion, where the body was resting on the table, was then removed from the live model. The interior of this initial mold was then painted with a creamy latex coating which when removed from the initial mold, and suitably reinforced, served as a hollow positive mold.

Figure 3:
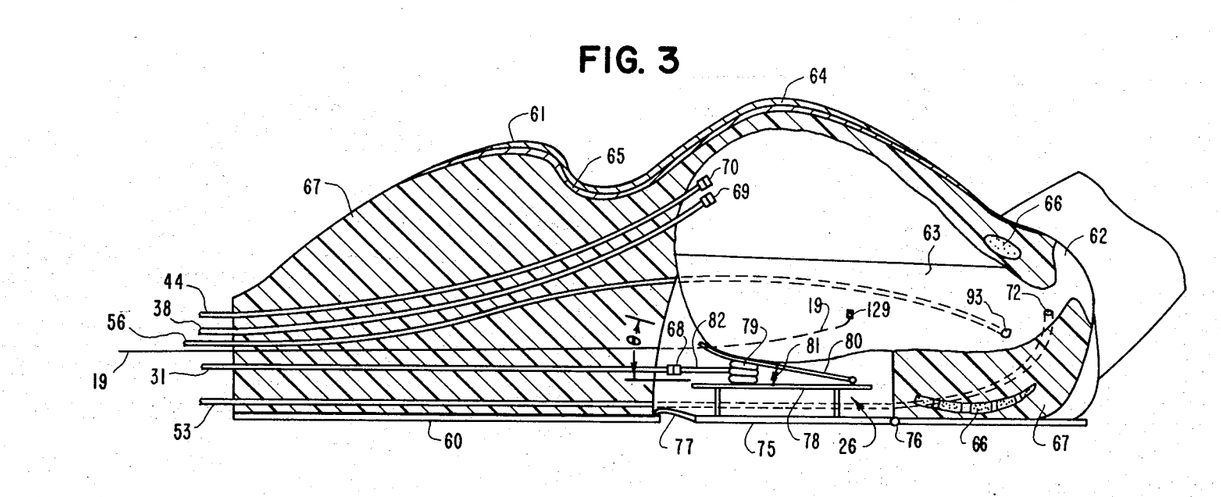
FIG. 3 is a longitudinal sectional view of the manikin with parts shown in elevation.

This hollow mold was then shaped to provide the same proportions as those of the live model and a negative mold of plaster material, such as Microstone, was cast around the outer surface of the shaped positive latex mold while lying upon a flat base. Thereafter, the latex positive mold was removed from the negative mold and the manikin as seen in FIGS. 3 and 4 was constructed as follows.

First, a skin colored natural latex rubber (such as Cis-Isoprene available from Firestone Co. as S4-Latex) was mixed with a suitable catalyst dispersion material and with silicone antifoam, and was painted on the interior surfaces of the negative mold to provide a skin 61 for the manikin. The natural skin coloration was achieved in the manner herein described under Pigmentation Procedures.

The skin 61 within the plaster mold was painted with a bonding agent, such as a polyurethane activated coating, and a ⅛ inch sheet 64 of polyurethane foam which has been treated in a sodium hydroxide solution was placed in firm contact with the skin 61. Nest to simulate adipose tissue and to give a realistic tactile sensation to the student a ⅜ inch layer 65 of polyvinyl chloride gel was deposited upon the foam sheet. (This adipose tissue layer preferably extends from the breast area to the thighs and in the abdominal region well toward the back of the manikin.) The treatment of the foam sheet with the solution and the treatment of the skin with the bonding agent meanwhile serves to permit the gel to pass through pores of the foam sheet and to become bonded to the skin of the manikin.

Figure 4:
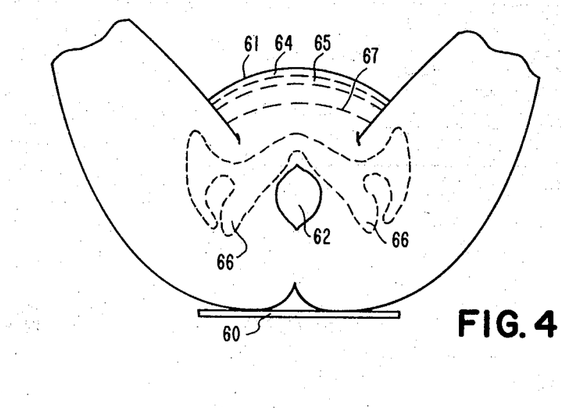
FIG. 4 is an end elevation of the manikin indicating the position of the pelvic bone.

A pelvic bone 66, as best shown in FIG. 4, was formed as follows. A real female pelvis of a laboratory skeleton was coated numerous times with a vulcanized latex to produce a flexible but stiff mold. Upon being removed from the actual pelvis the stiff mold was filled with a fiberglass-resin material including sawdust and white pigment and upon curing and removal from the stiff mold the pelvic bone was ready for insertion into the manikin. Meanwhile by means of a separate positive mold, representative of the volume and shpe dimensions of the uterus and vaginal opening, an imitation uterus was provided and on which the combined birth canal 62 and open-top receptacle member 63 was formed by painting a coat of natural latex.

The pelvic bone and imitation uterus were then positioned within the hollow manikin and the entire remaining space within the plaster mold of the manikin was filled with flexible polyurethane foam 67, the birth canal meanwhile having been attached to the skin of the manikin at the vaginal opening by additional coats of latex. After curing of the foam, a section of the same was cut away to provide access to the imitation uterus and to leave a space later to receive the uterus rocking member. Then the imitation uterus was removed leaving behind the receptacle member 63 and birth canal 62 which readily slip from that imitation uterus. For purposes of collapsing the foam filled manikin and removing it readily from its encasing mold, the pelvic bone likewise is removed temporarily and after the manikin is free of its mold, the pelvic bone is reinserted after which the manikin is attached at its lower side to the base plate 60 with an aperture therein. As will be apparent, the manikin now contains a space into and from which the simulated uterus forming a significant feature of the invention, can now be moved.

The electrical conductor 19 as well as the conduits 31, 38, 44 and 56 (FIG. 1) are now extended through the foam 67 to terminate in detachable couplings 129, 68, 69, 70 and 93 respectively. The water supply line 53 likewise is extended through the foam 67 and has an open end at 72 lying beneath the pelvic bone and in open communication with the interior of the receptacle portion 63. The aperture in the base plate is then fitted with a door member 75 hinged at 76 and adapted to be latched at 77 to the base plate. This door carries a platform 78 mounting a bellows-like wedge 79 interposed between the platform and a pivoted cradle 80 which is adapted to bear against the uterus-containing receptacle 63 when the bellows is inflated, and against the bias of a restoring means such as spring 81. This cradle is adapted to pivot through a suitable angle $\theta$ (FIG. 3) which may be as much as 30°. A suitable flexible conduit 82 from the bellows is adapted to engage with coupling 68 after the manikin is prepared for a childbirth demonstration and before the door 75 is latched.

The Uterus

Figures 5, 9:
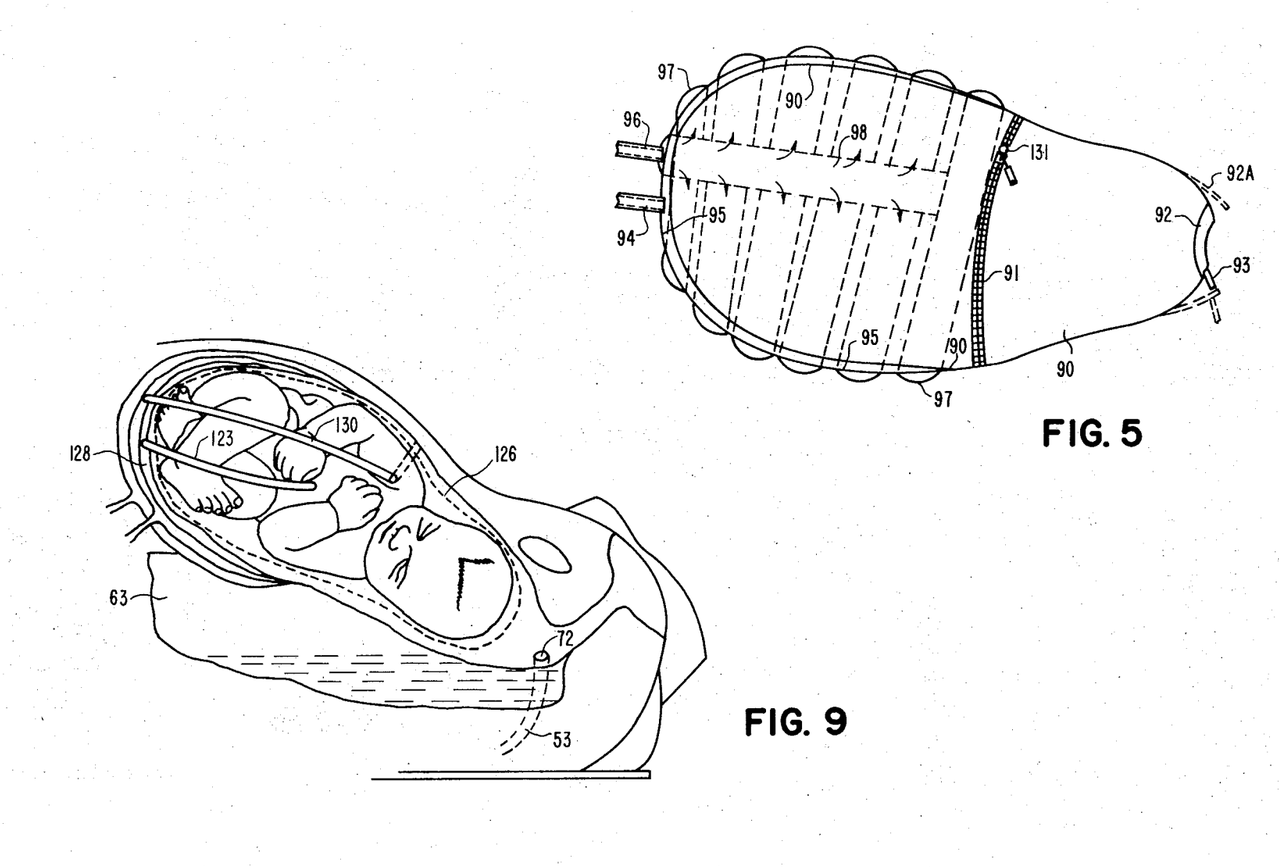
FIG. 5 is a side elevation view of the uterus.
FIG. 9 is a diagrammatic view of the uterus and its associated members in position within the manikin.

A preferred method for constructing the uterus involves providing a plaster positive mold representative of an actual full term pregnant uterus as regards size and shape and then painting the entire mold several times with natural latex rubber. A nylon mesh is wrapped around the painted mold for reinforcement and more coats of latex are painted until a thickness of about 8–10 coats is obtained to form the inner wall 90

(FIG. 5). A conventional zipper 91 extending substantially around the entire wall periphery is then bonded to the wall with latex with a gap being provided between the ends of the zipper, and the deposited layer beneath the zipper is then cut. In addition, a distendable cervix portion 92 formed of a hollow generally annular shaped member of latex material and having a conduit 93 extending therefrom for connection to conduit 56 (FIG. 1) is fixed to the inner wall at the uterus opening, for a purpose later to be described.

A masking material such as a sheet of cellophane is then wrapped around the larger portion of the uterus inner wall while still on the positive mold and with at least ½ inch being between the zipper and the adjacent edge of the masking material. A plastic air coupling 94 is positioned on the cellophane and extends outwardly and nylon mesh with the air coupling projecting therethrough is placed over the entire cellophane sheet after which about 8 coats of latex are painted over this mesh to form the middle wall 95 of the uterus and which middle wall will later balloon outwardly from the inner wall when air is supplied through coupling 94.

Thereafter, a narrow strip of cellophane is wound in generally spiral fashion around the middle wall and with a header strip of cellophane touching the turns of that narrow strip. A second air coupling 96 is positioned on the header strip projecting outwardly and another layer of nylon mesh is placed over the described assembly. Thereafter, about 8 coats of latex are painted over this mesh to form the third or outer wall 97. As will be noted, this third wall, representing the fundus of the uterus, is attached in a spiral fashion to the middle wall, but is not attached to the inner wall. Moreover, the manifold portion 98 permits air to enter the spiral spaces inside the outer wall in a fashion permitting a realistic contraction of the uterus. Having thus fabricated the uterus on the mold the assembly is cured in an oven for about 30 minutes at 220°F. and upon opening of the zipper the uterus member is removed from the mold and is ready for use within the manikin, an aperture 131 meanwhile being formed in the gap between the ends of the zipper.

The Fetal Doll

A preferred method for constructing the fetal doll involves using a dead full-term fetus coated with vaseline for the making of a mold as follows. The fetus is placed on its back in a box and Silastic A is poured around the fetus until approximately half of the fetus is covered whereupon indexing means such as large marbles are half submerged in the thus formed half mold at its upper face and a parting coating of vaseline is coated over the face and marbles. Then Silastic A is poured over the remainder of the fetus to complete the second half of the mold. After setting of the material, the mold halves are separated and the fetus removed therefrom. The thus formed two-part initial negative mold is cleaned and coated with vaseline and Silastic A is filled into the lower half of the negative mold with particular care being taken to fill the hand and feet spaces thereof.

Thereafter, the other mold half with a filling aperture provided at the head region is filled to the described first half of the filled mold and Silastic A is forced through the aperture until the mold cavities are filled. This results in a solid Silastic fetus which upon being removed from the mold halves then serves for the preparation of a two part negative mold formed of Microstone and cast in the same way as the initial negative mold of Silastic was prepared.

Having available the plaster negative mold the interior surfaces of the mold halves are painted with a solution of calcium nitrate and the two halves with entry parts extending into the mold spaces corresponding to the heel of each foot are scaled together and placed in a rotatable jig. A skin colored natural latex rubber, such as Cis-Isoprene was then prepared as indicated under Pigmentation Procedures and was poured into the sealed mold through one port until the mold interior is filled, the other port permitting expulsion of air. Upon closing of both ports followed by periodic rotations of the jig a layer of skin for the fetal doll is built up after which the unused portion of the fluid latex is drained from the mold. The mold then is removed from the jig and placed in a curing oven for about 36 hours at about 120°F. whereupon the mold parts are detached leaving the hollow fetal doll of live size proportions and appearance with the skin 100 covering the same.

Figure 6:
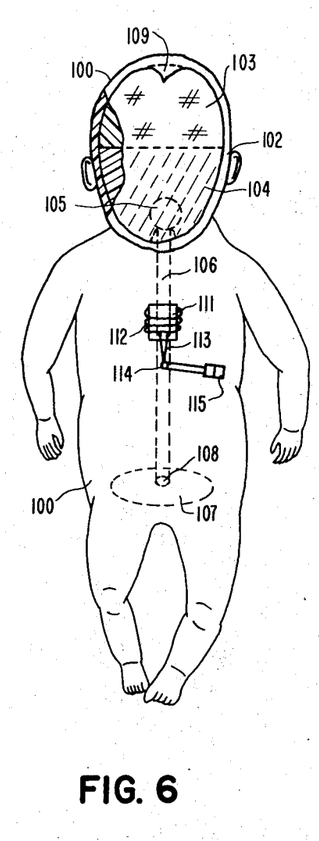
FIG. 6 is a face view of the fetal doll with interior parts indicated by dotted lines.

The back of the doll is then cut longitudinally and a zipper 101 is bonded to the skin along the opening by painting on several coats of latex. With the doll opened, the inside of its body portion is coated with polyurethane as described with respect to the manufacture of the manikin. The fetal skull is prepared as follows. The skull of a dead full-term fetus is covered with latex to produce a flexible but stiff positive mold which after removal from the fetal skull is partially filled with marine resin and rotated to build up a layer 102 about 1/4 inch thick within the positive mold. Thereafter, the positive mold is removed and the top portion of the hollow skull of resin is filled with polyvinyl chloride gel and the lower portion 104 is filled with Silastic A. As shown in FIG. 6, the lower skull portion includes a ball joint 105 encased in the silastic material and attached to a wooden or fibreglass rod 106 simulating a spine. At the lower end of the rod a plate 107 joined to the rod with another ball joint 108 is provided, the purpose of which will later appear. The resin layer 102, moreover, is cut at various places to provide flexibility during passage of the fetal doll head through the birth canal 62 of the manikin and includes the anterior and posterior fontanels 109, 110 respectively which can be identified by digital inspection during the instruction of the student.

Figure 7:
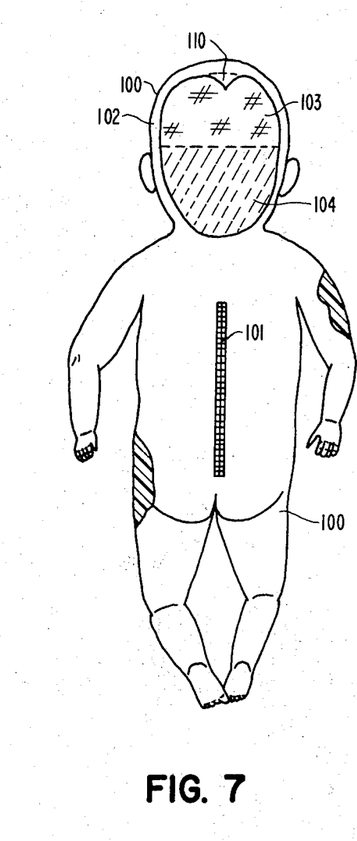
FIG. 7 is a back view of the doll of FIG. 6.

With the simulated skull and spine thus prepared, it is placed in proper position within the opened doll and a speaker 111 is suspended in the chest cavity by means of nylon thread 112. This speaker has attached thereto the electrical cord 113 which projects about three inches from the navel 114 of the doll and terminates in a speaker-jack 115 (FIG. 6). Following installation of the speaker the doll is then placed in the position of FIG. 7 and polyvinlyl chloride gel is poured into the doll to fill all space therein after which the zipper 101 is closed. The filled doll which may weigh about seven pounds is then replaced in the microstone negative mold to insure fidelity to its original shape and after curing in the mold is removed and is ready for use with the above-described uterus.

The Placenta, Amniotic Sac, and Umbilical Cord

A two part negative mold 120, 121 (FIG. 8) of Silastic A and B is made from a real placenta by following a molding procedure as taught with the molding of the fetal doll. The placenta is then removed and an elongated flexible cord 123 including electrical conductors and of a size and length similar to an actual umbilical cord is passed through an opening in the mold 120. At one end the cord terminates in a coupling 124 adapted for attachment to the jack 115 of the fetal doll and at the other end the cord terminates in a coupling 125. A disc shaped piece of fabric 126 is attached to the cord adjacent the coupling 125.

Figure 8:
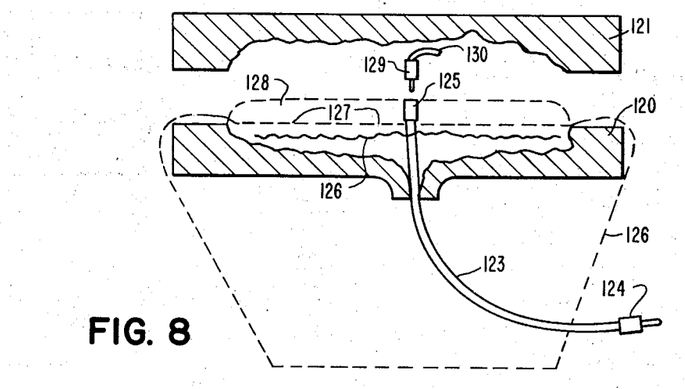
FIG. 8 is a diagrammatic view indicating the molding of the placenta and showing the placenta with attached umbilical cord and amniotic sac.

The lower mold 120 is then filled with polyvinyl chloride gel containing red pigment and surrounding the fabric. Then a preshaped latex membrane 126 simulating an amniotic sac and of sufficient size to enclose all of the fetal doll (except at the top of its head portion, FIG. 9) is placed over the thus filled half 120 of the mold, the membrane having apertures 127 at the region where it overlies the mold. A mass of the same gel is then placed above the membrane and the other mold half is closed, excess gel being squeezed outwardly. The closed molded materials are aged for about 12 hours after which the molded placenta 128 is removed and a jack 129 is attached to the umbilical cord for later connection with an electrical conductor 130. As will be understood this conductor 130 (FIG. 9) lies within the inner wall of the uterus, extends through the opening 131 of the zipper gap and will be connected to conductor 19 to provide for heart beat transmission during the teaching procedure.

Pigmentation Procedures

For added value in teaching it is important that the fetal doll and manikin not only feel realistic, but also appear the same. In contrast with conventional dolls made of leather and manikins made of wood or metal the present invention is able to achieve the desired realism. A preferred method for securing the life-like color of the manikin includes adding to 2,000 grams of the latex and mixing for 10 minutes therewith a semifluid paste comprising about 25 grams of white titanium dioxide pigment and about 78 grams of peach titanium dioxide pigment mixed dry with each other and stirred in just enough water to form the paste. This pigmented latex is with a suitable catalyst dispersion prior to being applied to the mold surfaces and at a time not more than three hours before being so applied.

In making the fetal doll 2,000 grams of the latex has added thereto and similarly mixed a semi-fluid paste comprising the same amounts of the white and peach pigments together with about 7.4 grams of red titanium dioxide and about 3.3 grams of blue titanium dioxide, all of the pigments being available from American Crayon Co.

Method of Operation

Having available the manikin and associated elements for teaching maternity patient care, the uterus is opened with the zipper and upon being lubricated with a coating of suitable material the fetal doll and placenta are placed therein with the umbilical cord 123 attached and the conductor 130 extended to the exterior of the uterus, as best shown in FIG. 9. After closing the zipper, the assembly is then placed in the manikin through the open door 75 and the uterus is partially encased by the flexible receptacle portion 63 and with the head of the doll supported adjacent the pelvic bone of the manikin. The electrical connections to conductor 19 is made and the several air line connections between the uterus and the conduits at 69, 70 and 93 are completed. The air line connection to wedge 79 is completed and the door 75 is closed thus placing the manikin in readiness for a cycle of teaching instruction and providing an additional support to the uterus by means of the pivoted cradle member 80.

Figures 12, 13:
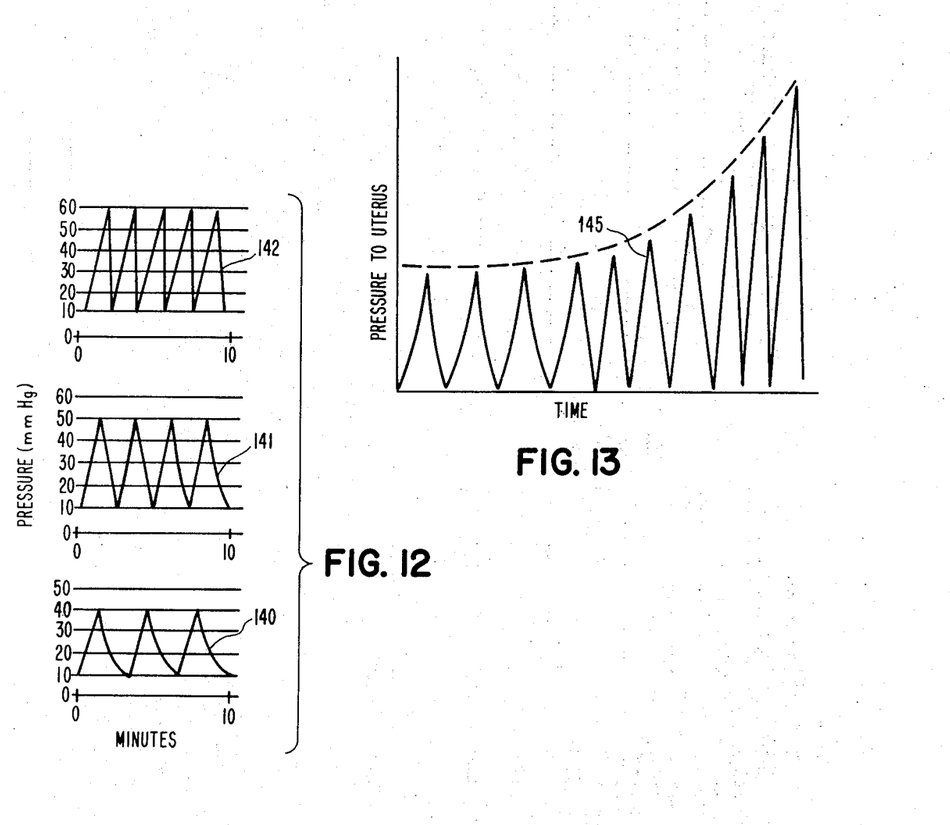
FIG. 12 is a chart indicating timed intra uterine pressures during the teaching procedure.
FIG. 13 is a chart indicating the curve of the timed pressures applied to the uterus during the teaching procedure.

The physiological data which is programmed on the dual channel datatrack 10 includes responses to be made by the uterus during the simulated labor and delivery. A second channel controls the air pressures which are to be applied to the uterus between its respective walls to simulate a muscular action and the contractions leading to expulsion of the fetal doll. Such data are illustrated in FIG. 12 wherein the frequency of contraction and the amplitude during early first stage, advanced first stage, and second stage of labor are represented by traces 140, 141 and 142.

Figure 11:
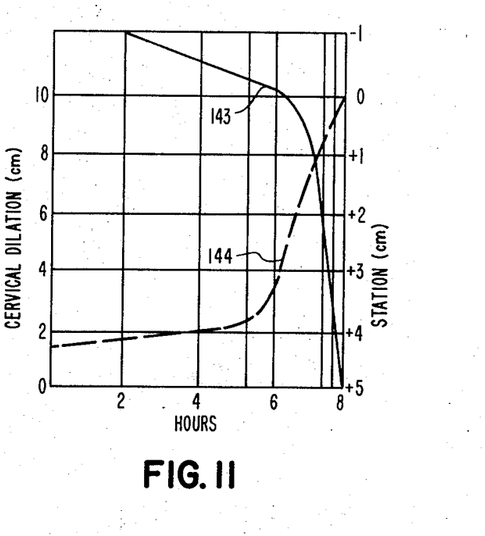
FIG. 11 is a chart indicating the timed cervical dilation and position of the doll during the teaching procedure.

Similarly, in FIG. 11, the position of the fetal doll and the dilation of the cervix are plotted as curves 143 and 144 against a time interval of eight hours. The actual trace 145 on the second channel of the data track is represented in FIG. 13 as a consolidation of traces 140 to 144 and indicates pressures applied to the uterus through conduits 38 and 44 as plotted aginst time. As will be understood, the transducer 15 in association with the relays 35 and 41 governs these applied pressures in accordance with the signal which it is receiving from that second channel of the data track.

Figure 10:
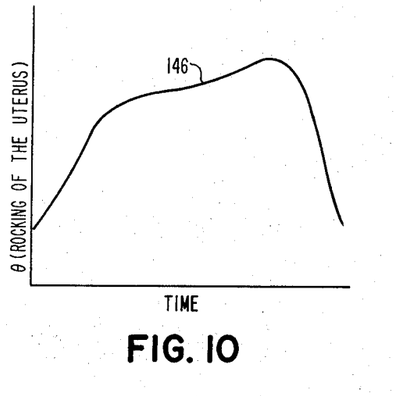
FIG. 10 is a chart indicating the timed rocking of the uterus of FIG. 9 during the teaching procedure.

A further phase of instruction includes the teaching of the positioning of the uterus to insure that the head of the doll is properly directed downwardly into the pelvic bone space in preparation for delivery. A shifting or rocking of the uterus through angle is generally desirable and the curve 146 of FIG. 10 indicates such angle with respect to time. The cradle 80 inside the manikin accordingly is actuated by the wedge 79 when compressed air is supplied thereto under control of transducer 14 and relay 28. The signal to the transducer is provided by the trace on the first channel of the data track.

Another phase of instruction involves a simulated breaking of water from the amniotic sac and which is initiated when a switch 8 on the revolving drum of the data track actuates the motor 50. When this occurs water is supplied through conduit 53 in the manikin and flows initially into the receptacle portion 63 until its level is high enough to flow out of the birth canal 62.

Still a further phase of instruction involves the dilation of the cervix and involving a deflation of the annular member 92 (FIG. 5) of the uterus. When compressed air is supplied to this member through conduit 56 a relatively rigid doughnut shaped appendage to the uterus is provided and which can be noted by digital examination by the student.

Such would be the case at an early stage of the curve 144 (FIG. 11). Later, this air is permitted to bleed gradually from member 92 through valve 57 and as this occurs the member 92 becomes flattened and dilated to a position such as indicated by 92 A permitting the head of the doll to move from the uterus.

Referring now to FIG. 2 wherein the chief elements of the electrical system are shown, it will be appreciated that a conventional console (not shown) is remotely placed with respect to the manikin, and that a conventional Audi-Pointer means (not shown) may be employed by the instructor to provide information to the students pertinent to the labor and delivery exercise.

One suitable electrical circuit for operating the apparatus in accordance with the invention includes conductors 200, 201 extending to a 110 volt A.C. source and with a switch 202 which when closed energizes a neon lamp 203 on the console control board. Simultaneously, closing of switch 202 energizes the match power packs 16 and 17 in readiness for signals later to be received from the data track 10. Subsequent closing of a second switch 204 energizes the coil of relay 205 closing its normally open contacts and energizing lamp 206. Simultaneously A.C. power is supplied to the heart beat amplifier 207 in readiness for signals later to be received from the heart beat simulator 18 and at the same time A.C. power is supplied to the heart beat power supply 209. The heart beat simulator 18 preferably is of the type generally defined in NASA Tech Brief No. 67-10239, but as such forms no part of the present invention.

Subsequent closing of a third switch 210 in both the A.C. and D.C. circuits serves to energize the coil of relay 211, and to open its normally closed contacts in the A.C. circuit. This closing of switch 210 also completes the D.C. circuit from the D.C. heart beat power supply 209 to the heart beat simulator 18 and from that heart beat simulator to the heart beat amplifier 207. This heart beat power supply preferably furnishes 13.5 volt D.C. current to the simulator and a manually operable potentiometer 215 is included in the simulator circuits to permit the instructor to vary the heart beat frequency for teaching purposes.

As will be apparent, upon the closing of switch 210 the simulator now supplies an audio signal to amplifier 207 which amplifies the same and passes it through the connection 19 to the manikin, thence through the conductor 130 to the placenta and thence through the umbilical cord 123 to the speaker 111 in the fetal doll.

With the heart beat now audible, a fourth switch 216 is now closed whereupon lamp 217 is illuminated. Thereupon, a fifth switch 218 is closed to illuminate lamp 219 and simultaneously to supply power to the coils of motor 50 which drives pump 51, and to place this pumping arrangement in readiness for operation either through switch 8 associated with the data track or through an instructor over-ride switch 221. For the purpose of varying the rate of flow through conduit 53 leading to the manikin a potentiometer 222 is provided to control the speed of motor 50.

As will be understood, the paper tracks used on the drum of member 10 can be changed to simulate either normal conditions as reflected by the composite curve 145 of FIG. 13, or by substituting a curve representing abnormal childbirth conditions for teaching purposes. Moreover the length of the exercise can be adjusted by using a different gear train to control rotation of the drum in the data track follower.

With the control system in readiness as above described and upon closing of the operating switch 223 the data track drum begins to turn and as indicated by FIG. 1 voltage signals proportional to the dual channel tracks are now sent to the already energized match power packs 16 and 17. Transducers 14 and 15 in association with the ratio relays 28, 35 and 41 govern the flow of compressed air to the manikin. At the beginning of the exercise air at about one pound per square inch superatmospheric, herein called 'base pressure', is supplied to the uterus between the inner and middle walls and between the middle and outer walls thus snugly encasing the placenta and fetal doll as shown in FIG. 9.

As signals from the channels of the data track are then received by the match packs and passed on to the transducers, the pressures of air passing through the ratio relays are varied according to the established program. Initially during the latent phase of labor the pressure in the space between the outer and middle walls of the uterus is periodically increased and then falls to the base pressure, the pressure between the middle and inner walls remaining meanwhile at the base pressure value. This simulates the muscular contractions of normal labor and involves a hardening of the wall of the uterus and a thickening of the fundus portion thereof and at the same time involves increasing the intensity of the uterine contractions.

Simultaneously, air under pressure being supplied to the wedge 79 under control of the first channel of the data track regulates the position occupied by the fetal doll and insures that the head of the doll is properly positioned with respect to the space within the pelvic bone structure of the manikin. As descent of the doll begins during the latter portion of the latent phase the instructor insures that the air previously supplied to the cervix portion of the uterus is gradually vented through valve 57 thus aiding in the dilation of the latex cervix as indicated in FIG. 11. Descent of the doll, moreover, is being accomplished by air now being supplied at increasing amplitude of pressures to the space between the inner and middle walls of the uterus under control of the second channel of the data track.

As will be understood, during this period of latent phase of labor the students are receiving instruction which may take the form of listening to the fetal heart beat with a stethoscope, digital examination of the cervix, palpation of the abdomen of the manikin, and other useful techniques. At an appropriate time during the descent of the doll switch 8 on the data track closes and pump 51 begins to supply water to the manikin and the water level in the receptacle portion 63 begins to rise (FIG. 9). When this level reaches a prescribed height corresponding generally to the time the head of the doll moves through the opening of the amniotic sac 126 such water flows from the birth canal simulating the 'breaking of water'.

Continued application of pressures of progressively higher amplitude and increased frequency to the space between the inner and outer walls of the uterus then forces the doll from the uterus simulating the delivery. As will be understood, the pressure applied to the doll by expansion of the uterus space between the inner and outer walls thereof acts upon the plate 107 and is transmitted to the skull through the simulated spine 106 thus forcing the head of the doll through the dilated cervix of the uterus.

Upon delivery of the doll, the student then disconnects the umbilical cord from the doll at the speaker-jack 115 whereupon the heart beat speaker is silenced and other instruction simulating the actual handling of a newly delivered child may be conducted. Subsequently, the umbilical cord and its attached placenta and amniotic sac are drawn from the uterus and the jack 129 is disconnected from the conductor 130. The switches 223, 218, 216, 204 and 202 are then opened in sequence to restore the system to inoperative condition and to avoid any damage to the heart beat simulator.

The door 75 of the manikin is then opened and the conduit connections to the wedge and to the uterus are disconnected, as is the connection between conductors 19 and 130. Thereafter, the uterus is removed from the manikin and is in readiness for the next cycle of instruction.

Having thus described the apparatus and method of operation, it will be seen that the apparatus is suitable for use in many cycles of operation without replacement of parts, and that a high degree of similitude to actual childbirth phenomena is presented to the student.

Obviously, other modifications and variations of the present invention are possible in the light of the above teachings. It is therefore to be understood that within the scope of the appended claims the invention may be practiced otherwise than as specifically described.

What is claimed is:

1. A training device of the type used in teaching maternity patient care comprising, a simulated uterus adapted to contain a fetal doll, said uterus having a flexible inner wall, a flexible middle wall attached to and inflatable with respect to said inner wall intermediate the extreme ends of the uterus, a flexible outer wall attached to and inflatable with respect to said middle wall, and means for supplying a pressure fluid independently into the respective spaces between said inner and middle walls and between said middle and outer walls.

2. A uterus as defined in claim 1 having a cervix portion and means for selectively supplying air under pressure to and removing air from said cervix portion.

3. A uterus as defined in claim 1 including means for selectively opening said uterus for insertion of said doll therein and for closing said uterus after insertion of said doll.

4. A uterus as defined in claim 1 having an opening therein for receiving an electrical conductor leading to said doll.

* * * * *